US010695994B2

(12) United States Patent
Zhu et al.

(10) Patent No.: US 10,695,994 B2
(45) Date of Patent: Jun. 30, 2020

(54) QUICK TIRE REPAIRING NAIL AND USING METHOD THEREOF

(71) Applicant: Guochao Zhu, Jiaxing (CN)

(72) Inventors: Pengtian Zhu, Jiaxing (CN); Guochao Zhu, Jiaxing (CN)

(*) Notice: Subject to any disclaimer, the term of this patent is extended or adjusted under 35 U.S.C. 154(b) by 586 days.

(21) Appl. No.: 15/251,115

(22) Filed: Aug. 30, 2016

(65) Prior Publication Data
US 2017/0129196 A1 May 11, 2017

(30) Foreign Application Priority Data

Nov. 5, 2015 (CN) .......................... 2015 1 0755168
May 27, 2016 (CN) .......................... 2016 2 0532585

(51) Int. Cl.
B29C 73/06 (2006.01)
F16B 33/00 (2006.01)
F16B 35/06 (2006.01)
B29C 73/08 (2006.01)

(52) U.S. Cl.
CPC ............ B29C 73/06 (2013.01); B29C 73/066 (2013.01); F16B 33/002 (2013.01); F16B 33/004 (2013.01); F16B 35/06 (2013.01); B29C 73/08 (2013.01); Y10T 152/10891 (2015.01); Y10T 152/10909 (2015.01)

(58) Field of Classification Search
CPC ..... B29C 73/066; B29C 73/063; B29C 73/06; B29C 73/08; Y10T 152/10909; Y10T 152/109; Y10T 152/10891; F16B 33/004; F16B 33/002; F16B 33/00; F16B 35/06; F16B 39/225; F16B 39/22

USPC .................... 152/368–370; 156/97; 81/15.7; 411/369, 378, 542, 915, 903, 907, 908
See application file for complete search history.

(56) References Cited

U.S. PATENT DOCUMENTS 3,296,048 A * 1/1967 Wolfe .................... B29C 73/06
152/370
4,827,998 A * 5/1989 Stanfa .................... B29C 73/06
152/368

FOREIGN PATENT DOCUMENTS

DE 1 118 441 * 11/1961

OTHER PUBLICATIONS

English machine translation of DE 1 118 441, Nov. 30, 1961.*

* cited by examiner

Primary Examiner — Adrienne C. Johnstone
(74) Attorney, Agent, or Firm — Wang Law Firm, Inc.

(57) ABSTRACT

The present disclosure discloses a quick tire repairing nail. The quick tire repairing nail includes a tire repairing screw made of hard materials, at the front end of the tire repairing screw is provided with a sharp portion and at the rear end of the tire repairing screw is provided with a screw head, and a surface of the screw head which is far away from the tire repairing screw is provided with a concave-convex matching structure. The tire repairing nail further includes a sealing sleeve wrapping the outside of the screw head and/or the tire repairing screw, the sealing sleeve is made of soft materials and has a taper structure with a small front end and a bigger rear end.

9 Claims, 4 Drawing Sheets

Vehicle tire

QUICK TIRE REPAIRING NAIL AND USING METHOD THEREOF

CROSS-REFERENCES TO OTHER APPLICATIONS

This application claims the priorities of Chinese patent application number 201510755168.8, filed on Nov. 5, 2015, and of Chinese patent application number 201620532585.6, filed on May 27, 2016, the entire contents of which are incorporated herein by reference.

FIELD OF THE DISCLOSURE

The present invention belongs to the technical field of tire repairing and in particular, relates to a quick tire repairing nail and an using method thereof.

BACKGROUND OF THE DISCLOSURE

In daily life, the conventional human-powered transport has been replaced by transportation tools. The transportation tools comprise various transport machines, including automobiles and motorcycles, and all of these transportation tools have a plurality of tires. For example, when driving, an automobile will often encounter a situation in which the tire is punctured by sharp objects on the road, thereby causing a flat tire, and the punctured hole of the tire must be repaired. The most traditional method for repairing a tire is cold or hot tire repairing, wherein a rubber piece is pasted onto the inner surface of the tire where the punctured position is located to block the punctured hole and these repairing methods can be executed only by professional technicians at a tire repairing place, which not only takes a long repairing time but also needs specialized tire disassembling devices.

In addition, useful patents of CN88203970 and CN201320552797.7 use a rubber nail for repairing tire and a tire puncture wound repairing component with self-sealing layer receptively. The two tire repairing methods are substantially identical, comprising a tire repairing nail for sealing a puncture wound, and a rubber piece adhered to the puncture wound and used for sealing and fixing the tire repairing nail, wherein the tire repairing nail comprises a nail cap and a nail body, one end of the nail body and the nail cap are fixed, and the diameter of the rubber piece is greater than that of the nail cap. When in use, the tire is disassembled from the wheel rim, the nail body of the tire repairing nail is pushed into the puncture wounds from the inside of the tire and then one side of the rubber piece is adhered to the self-sealing layer of the tire, making the rubber piece cover the nail cap and the puncture wounds to implement the tire repairing.

No matter whether it is cold or hot tire repairing or the two disclosed patented technologies of tire repairing, the wheel needing to be repaired must be disassembled from a vehicle and tire repairing can be done only after the tire has been removed by a specialized tire removing tool from the wheel rim, which needs a very long time and professional tools as well as people to complete, thereby bringing great troubles to tire repairing. In addition, during the removing and installing of the tires, the surface of the wheel rim is susceptible to damage, such as scratches, influencing the artistic appearance of the automobile, especially high-end vehicles. Furthermore, even if these puncture wounds have been repaired in the inner wall of the tire, but the puncture wounds on the outer surface of the tire are expose and will be embedded by foreign matters such as rocks or intruded by water when in use, influencing the repairing firmness and causing air leakage phenomenon to easily occur to the puncture wounds again.

SUMMARY

The object of the present invention, directed to the above problems, is to provide a quick tire repairing nail that is more reasonably designed and may conveniently, easily and quickly repair a tire.

Another object of the present invention, directed to the above problems, is to provide a method for using the quick tire repairing screw with an easy operation and a quick tire repairing speed.

To reach the above objects, the present invention adopts following technical scheme: the quick tire repairing nail comprises a tire repairing screw made of hard materials, wherein the front end of the tire repairing screw is provided with a sharp portion and the rear end of the tire repairing screw is provided with a screw head. The end of the screw head far away from the tire repairing screw is provided with a concave-convex matching structure matched with the tool for rotating the screw. The tire repairing nail further comprises a sealing sleeve wrapping the outside of the screw head and/or the outside of the tire repairing screw. The sealing sleeve is made of soft materials and the sealing sleeve has a taper structure with a small front end and a big rear end. The sealing sleeve deforms under a radial extrusion force, thereby blocking the puncture wounds, wherein the sealing sleeve is sealed against the puncture wounds and the sealing sleeve is tightly coupled to the screw head and/or the tire repairing screw. Thus, air leakage phenomenon is avoided. Of course, the sealing sleeve may sleeve the whole tire repairing screw and the tire repairing screw, the sharp portion and the screw head are connected as an unitary structure. The tool comprises any one of the screw driver, the polygonal wrench and the socket.

The tire repairing screw further includes at least one air checking ring at the end approaching to the screw head, the outer diameter of the air checking ring is less than or equal to or more than that of the screw head. When there are multiple air checking rings, the outer diameter of the air checking rings are same or gradually narrowing from the screw head to the sharp portion. The air checking ring nearest to the screw head forms an annular positioning slot with the screw head, thereby avoiding the falling out of the sealing sleeve and the tire repairing screw. And, the rubber of the tire can be intruded into the annular positioning slot.

The sealing sleeve sleeves the outside of the air checking ring, and an oriented angular surface slanting towards the sharp portion is formed on the outer wall of the air checking ring. The sealing sleeve seals the air checking ring.

The outer wall of the screw head is provided with an outer annular conical surface slanting towards the tire repairing screw, and the end of the sealing sleeve nearing the screw head is provided with an inner annular conical surface matched with the outer annular conical surface.

The outer annular conical surface and/or the oriented angular surface is provided with a plurality of annular protrusions with a gradually narrowing outer diameter and each two adjacent annular protrusions are connected or spaced. The screw head and the annular protrusions are connected as an unitary structure. The annular protrusion includes an arc or acuminate convex.

The sealing sleeve is injection molded and firmly embeds the tire repairing screw, the screw head and the air checking ring; or the sealing sleeve is a soft band coiling around the tire repairing screw, the screw head and the air checking ring. If the sealing sleeve is injection molded, some internal spiral grooves are formed corresponding to the threads of the tire repairing screw.

A plurality of threads are exposed on the sharp portion, and a corresponding front end portion of the sealing sleeve is smoothly transited to the exposed threads; and the thread of the tire repairing screw is arranged with a position limiting structure for preventing the tire repairing screw from rotating in the direction opposite to the screwing-in direction of the tire repairing screw. The concave-convex matching structure is a cross recess or a straight slot or a concave multi-arris recess or other shape structures. The diameter of the big head end of the sealing sleeve is equal to or less than the outer diameter of the screw head.

An outer wall of the sealing sleeve is an annular conical surface, to be swimmingly intruded into the puncture wounds.

As another embodiment, an outer wall of a front end of the sealing sleeve is provided with spiral protrusions corresponding to the threads on the tire repairing screw, and a rear end of the sealing sleeve is provided with at least one annular protrusion corresponding to the air checking ring. An annular positioning slot is formed on the outer wall of the sealing sleeve nearby the annular protrusion. The annular protrusion and the annular protrusion is capable of improving the structural strength after intruding the tire repairing screw to the puncture wounds, thereby avoiding the falling out of the sealing sleeve 2.

The outer annular conical surface and/or the oriented angular surface is provided with a plurality of annular grooves with a gradually narrowing outer diameter and the two adjacent grooves form an annular protrusion.

As another embodiment of this disclosure, the method for using the quick tire repairing nail comprises following steps of:

(a) rotating a tire installed in an automobile that needs to be repaired to the repairing position where the puncture wounds of the tire is visible, examining whether the puncture wounds has a foreign matter within it and pulling out the foreign matter if it exists; and (b) aiming the sharp portion of the front end of the tire repairing screw at the puncture wounds, using a tool and making the tool match with the concave-convex matching structure, rotating the tool by the action of an external force and thus driving and squeezing the tire repairing screw, the sealing sleeve and the screw head continuously into the puncture wounds wherein the rear end face of the screw head is flush with the outer surface of the vehicle tire or the rear end face of the screw head is caught in the outer surface of the vehicle tire.

Compared with the prior art, the advantage of the present invention is:

First, the quick tire repairing nail is screwed into the puncture wounds with its screw threads formed on the front end, and the soft sealing sleeve which is wrapped up in the outer surface of the tire nail is squeezed/intruded into deep wound with the air checking ring and screw head together, to plug, squeeze, and infiltrate the puncture wound. As such, the soft sealing sleeve can couple the damaged surfaces and adhere the screw, to fill the puncture wound and prevent air leakage.

Second, the quick tire repairing nail and method thereof can be used without completely disassembling the wheels and being connected to the car, as long as the users know how to use a repair tool to screw the tire nail into the tire, the puncture wounds can be repaired. The driver may complete the repairing job at any time on their own, not requiring any dedicated professional staff or device. That is to say, the method is particularly simple and in low cost, but fast and with good sealing performance, and can be completed at any time.

Third, the quick tire repairing nail is intruded into the tire from the outer surface thereof, thus, it can completely avoid other foreign matter rip into the original puncture wounds from the appearance of the original tire puncture wound again to cause the air leakage. Therefore, the reliability of repairing is enhanced, and more advantage than the traditional cold and hot tire repairing method.

Fourth, the structure is simple and easy to manufacture.

DETAILED DESCRIPTION OF ILLUSTRATED EMBODIMENTS

The technical scheme of the present invention will be further described with following specific embodiments in conjunction with the drawings, but the present invention is not limited to these embodiments.

Figure 1:
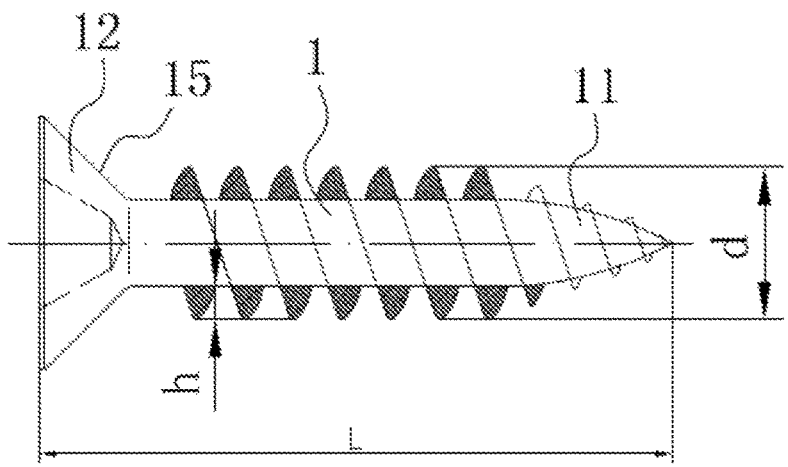
FIG. 1 is a structure diagram of a tire repairing screw, according to an embodiment of the present invention.

As shown in FIG. 1, the quick tire repairing nail comprises a tire repairing screw 1 made of hard materials, the hard material comprising any one of the carbon steel, the aluminum alloy or plastic, the stainless steel and the copper material. The outer diameter (d) of the thread of the tire repairing screw 1 is 4-12 mm, the length (L) of the tire repairing screw 1 is 8-65 mm and the height (h) of the thread tooth is 1-3 mm.

Figure 2:
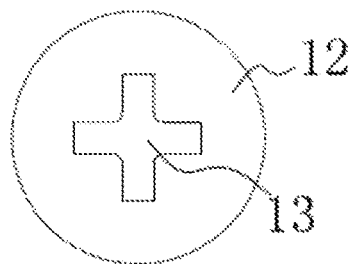
FIG. 2 is a structure diagram of a concave-convex matching structure of a screw head of the tire repairing screw of FIG. 1.

As shown in FIGS. 1-2, the front end of the tire repairing screw 1 is provided with a sharp portion 11 and the rear end of the tire repairing screw 1 is provided with a screw head 12. The end of the screw head 12 far away from the tire repairing screw 1 is provided with a concave-convex matching structure 13 matched with the tool for rotating the screw, wherein the concave-convex matching structure 13 is a cross recess or a straight slot or a concave multi-arris recess or other shape structures, wherein the concave multi-arris recess is an inner hexagonal recess or a plum-shaped recess or a square recess or an inner triangular recess. The tire repairing screw 1, the sharp portion 11 and the screw head 12 are connected as an unitary structure and the tire repairing nail of the present invention adopts the wood screw or the self-tapping screw.

Figure 3:
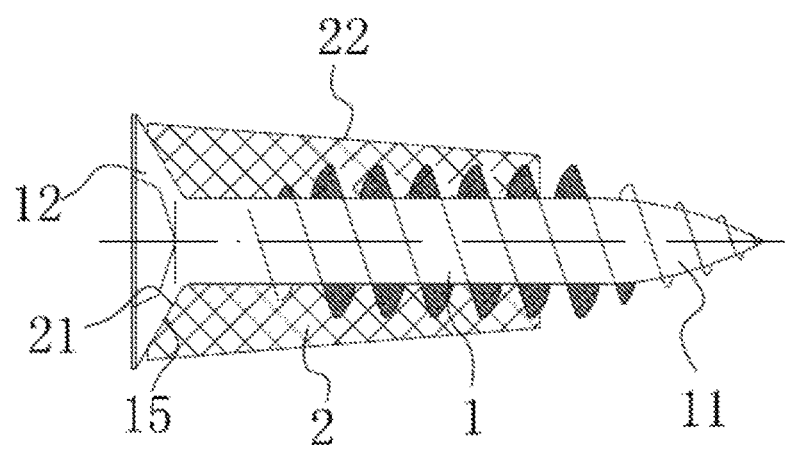
FIG. 3 is a structure diagram of a quick tire repairing nail according to an embodiment of the present invention.
Figure 4:
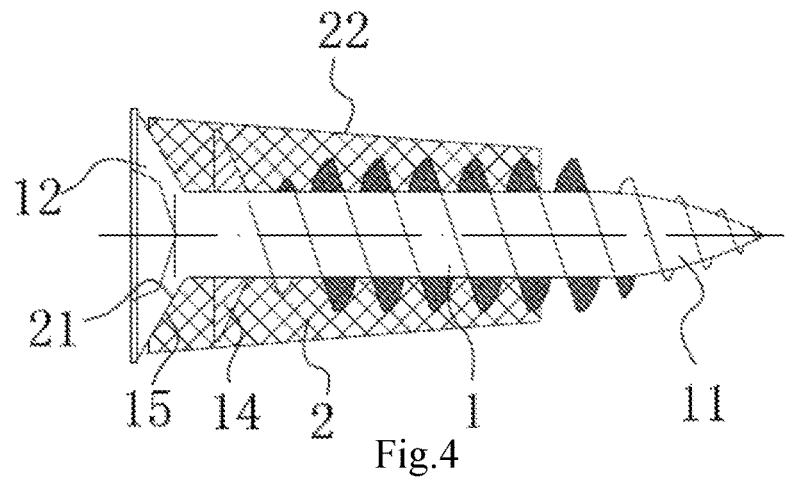
FIG. 4 is a structure diagram of FIG. 3 after being added with an air checking ring.
Figure 5:
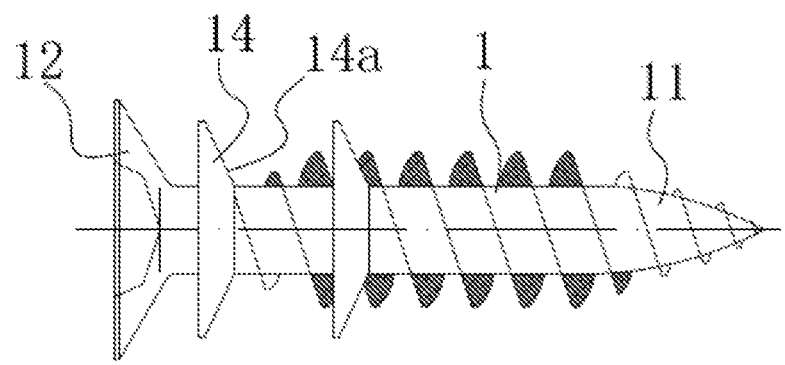
FIG. 5 is a structure diagram of a plurality of air checking rings provided by the present invention.
Figure 6:
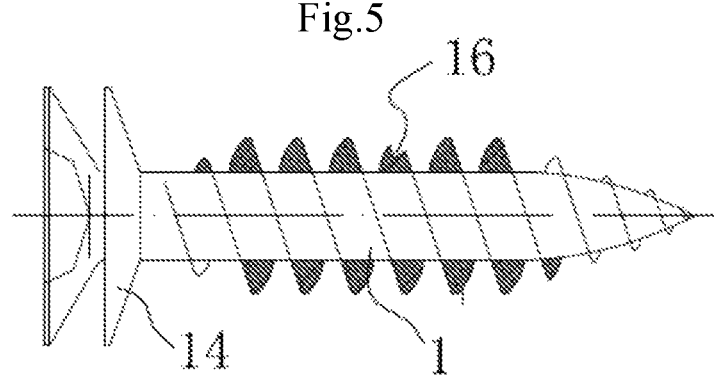
FIG. 6 is a structure diagram, illustrating that the outer diameters of the air checking ring and the screw head provided by the present invention are equal.
Figure 7:
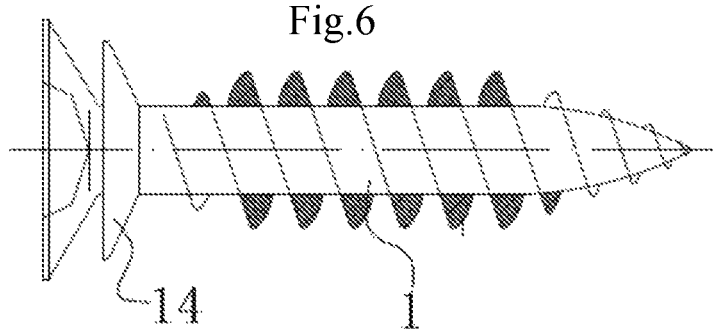
FIG. 7 is a structure diagram, illustrating that the outer diameter of the air checking ring is less than the outer diameter of the screw head provided by the present invention.

As shown in FIG. 3, the tire repairing nail further comprises a sealing sleeve 2 wrapping the outside of the screw head 12 and/or the tire repairing screw 1 and the threads at the front end of the tire repairing screw 1 are exposed wherein the front end portion of the sealing sleeve 2 is smoothly transited to the exposed thread portion; Of course, the sealing sleeve 2 may also sleeve the tire repairing screw 1 and the sharp portion 11. The thread of the tire repairing screw 1 is arranged with a position limiting structure for preventing the tire repairing screw 1 from rotating in the direction opposite to the screwing-in direction of the tire repairing screw 1, that is, it may prevent the tire repairing screw 1 from rotating in the direction opposite to the rotating direction of the thread, thereby avoiding becoming loose automatically and the hidden trouble of air leakage. The position limiting structure is particularly suitable for repairing the sidewall of explosion-proof vehicle tires. In particular, the position limiting structure comprises at least one position limiting notch 16 disposed at the screw tooth in the middle of the tread of the tire repairing screw 1; The diameter of the big head end of the sealing sleeve 2 is equal to or less than the outer diameter of the screw head; The sealing sleeve 2 is made of soft materials, the sealing sleeve 2 has a taper structure with a small front end and a big rear end and the outer wall of the sealing sleeve 2 is an annular conical surface 22. The soft material comprises any one of the rubber and the silica gel and preferably is the rubber in the present invention.

Next, as shown in FIGS. 4-9, the end of the tire repairing screw 1 provided with the screw head 12 further has at least one air checking ring 14 and the air checking ring 14 nearest to the screw head 12 forms an annular positioning slot with the screw head 12, thereby avoiding the falling out of the sealing sleeve 2 and the tire repairing screw 1. The outer wall of the air checking ring 14 is provided with an oriented angular surface 14a slanting towards the sharp portion 11 and the oriented angular surface forms a sharp corner with the rear end of the air checking ring 14 or the outer wall of the air checking ring 14 is provided with an arc surface or a cylindrical surface connected with the oriented angular surface. The tire repairing screw 1 and the air checking ring 14 are connected as an unitary structure. The number of the air checking ring 14 is 1 to 3 and too large number will result in an increased cost. Further, the shape of the air checking ring 14 is a keystone ring or a circular ring or a flat ring.

The optimum scheme is that the outer diameter of the air checking ring 14 is less than the outer diameter of the screw head 12. The air checking ring 14 may further improve the connection strength between the sealing sleeve 2 and the tire repairing screw 1. Meanwhile, after squeezing into the puncture wounds, the present embodiment may increase the connection structure strength with the vehicle tire, thereby avoiding the occurrence of falling out. In addition, even though the screw head 12 is worn, the air checking ring 14 may function as a second defensive line, thereby avoiding the loss of sealing function once the screw head 12 is worn.

Additionally, the sealing sleeve 2 sleeves the outside of the air checking ring 14. The sealing sleeve 2 is injection molded and firmly embeds the tire repairing screw 1, the screw head 12 and the air checking ring 14. The operation of the structure may increase the connection structure strength and the sealing between each other, thereby avoiding the leakage of the air within the vehicle tire after the completion of repairing the tire. Of course, the sealing sleeve 2 of the embodiment may be prepared separately and sleeves the outsides of the tire repairing screw 1, the screw head 12 and the air checking ring 14.

Figure 8:
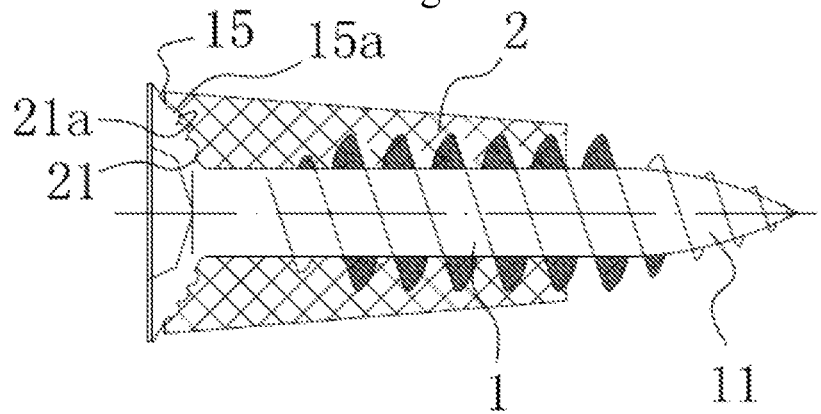
FIG. 8 is a structure diagram, illustrating that the outer annular conical surface provided by the present invention is arranged with annular protrusions.
Figure 9:
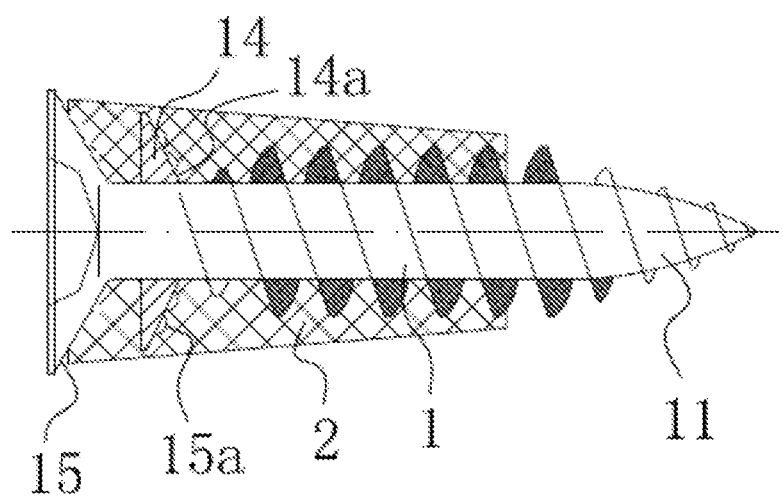
FIG. 9 is a structure diagram, illustrating that the oriented angular surface provided by the present invention is arranged with annular protrusions.

Furthermore, the outer wall of the screw head 12 is provided with an outer annular conical surface 15 slanting towards the tire repairing screw 1 and the end of the sealing sleeve 2 nearing the screw head 12 is provided with an inner annular conical surface 21 matched with the outer annular conical surface 15. The outer annular conical surface 15 and/or the oriented angular surface 14a is provided with a plurality of annular protrusions 15a with a gradually narrowing outer diameter and each two adjacent annular protrusions 15a are connected or spaced. As shown in FIG. 9, when at least one air checking ring 14 is disposed, the annular protrusion 15a is disposed on the oriented angular surface 14a of the most front air checking ring 14. As shown in FIG. 8, when no air checking ring 14 is disposed, the annular protrusion 15a is disposed on the outer annular conical surface 15. The screw head 12 and the annular protrusion 15a are connected as an unitary structure. As shown in FIGS. 8-9, the inner annular conical surface 21 is formed with the annular groove 21a matched with each of the annular protrusions 15a. Of course, both of the air checking ring 14 and the screw head 12 may be provided with the annular protrusion 15a. The structure of the annular protrusion 15a combined with the annular groove 21a may further increase the connection structure strength of the joint.

The quick tire repairing nail of the embodiment may be used to repair the punctured cover tires of the automobile, the motorcycle or the engineering vehicle by directly blocking the puncture hole and as a kind of "first aid" product for vehicles that may be taken along with vehicles.

As shown in FIGS. 1-14, the method for using the quick tire repairing nail comprises following steps of:

A. rotating the tire installed in an automobile that needs to be repaired to the repairing position where the puncture wounds of the tire is visible, examining whether the puncture wounds has a foreign matter within it and pulling out the foreign matter if it exists.

B. aiming the sharp portion 11 of the front end of the tire repairing screw 1 at the puncture wounds, using a tool and making the tool match with the concave-convex matching structure 13, rotating the tool by the action of an external force and thus driving and squeezing the tire repairing screw 1, the sealing sleeve 2 and the screw head 12 continuously into the puncture wounds wherein the rear end face of the screw head 12 is flush with the outer surface of the vehicle tire or the rear end face of the screw head 12 is caught in the outer surface of the vehicle tire. The rear end face of the screw head 12 is caught in the outer surface of the vehicle tire at a depth of 2-10 mm.

Embodiment 1

The tire repairing nail further comprises the sealing sleeve 2 wrapping the outsides of the screw head 12 and the rear end of the tire repairing screw 1. Such a structure may ensure the structural strength and the reliability of sealing.

Embodiment 2

Figure 10:
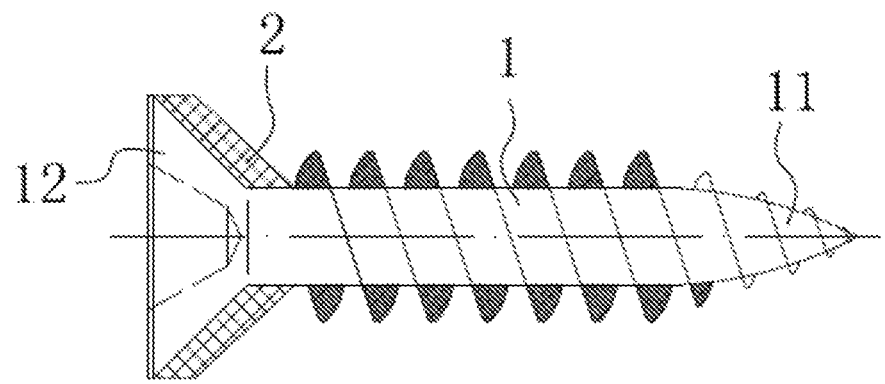
FIG. 10 is a structure diagram of the embodiment 2 provided by the present invention.

As shown in FIG. 10, the structure and principle of the embodiment are substantially identical with those of the embodiment 1, which will not be redundantly repeated herein, but the difference thereof is that: the tire repairing nail further comprises the sealing sleeve 2 wrapping the outside of the screw head 12.

Embodiment 3

Figure 11:
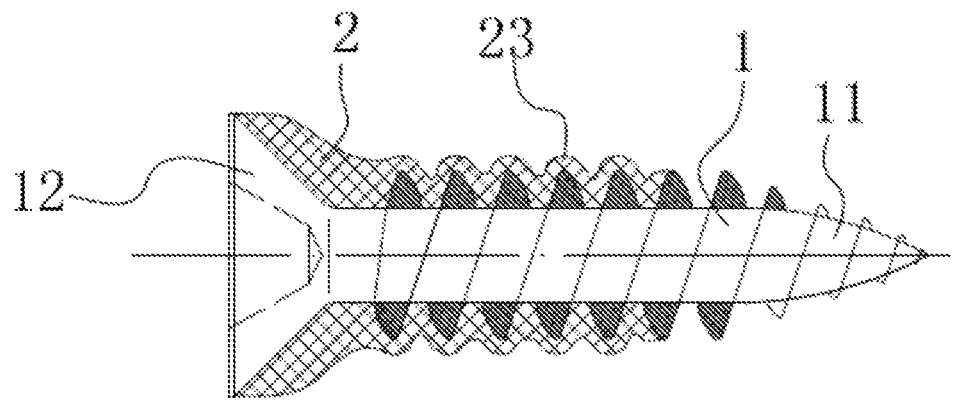
FIG. 11 is a structure diagram of the embodiment 3 provided by the present invention.
Figure 12:
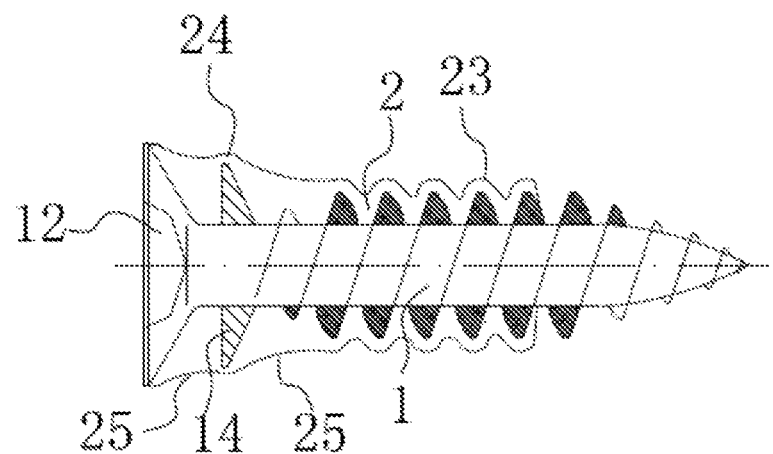
FIG. 12 is a structure diagram of FIG. 11 after being added with an air checking ring and annular protrusions.
Figure 13:
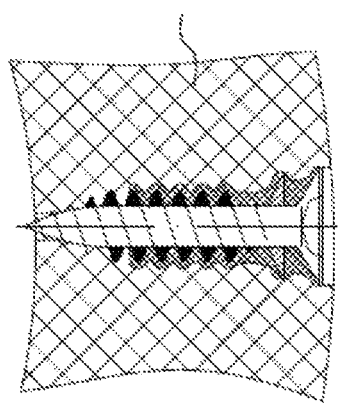
FIG. 13 is a structure diagram, illustrating that the tire repairing nail provided by the present invention is squeezed into a vehicle tire.
Figure 14:
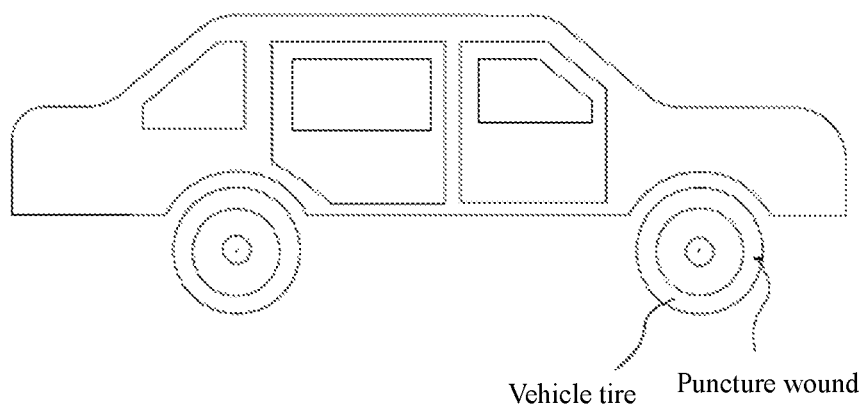
FIG. 14 is a structure diagram, illustrating that the tire repairing nail provided by the present invention is applied to the automobile tire.

The structure and principle of the embodiment are substantially identical with those of the embodiment 1, which will not be redundantly repeated herein, but the differences thereof are that: as shown in FIG. 11, the outer wall of the front end of the sealing sleeve 2 is provided with spiral protrusions 23 corresponding to the threads on the tire repairing screw 1; as shown in FIG. 12, the rear end of the sealing sleeve 2 is provided with at least one annular protrusion 24 corresponding to the air checking ring 14 and the outer diameter of the annular protrusion 24 is less than the outer diameter of the rear end of the sealing sleeve 2, thereby forming an annular positioning slot 25 between the two sides of the annular protrusion 24 and the outer wall of the sealing sleeve 2.

Embodiment 4

The structure and principle of the embodiment are substantially identical with those of the embodiment 1, which will not be redundantly repeated herein, but the difference thereof is that: the sealing sleeve 2 is a soft band coiling around the tire repairing screw 1, the screw head 12 and the air checking ring 14.

Embodiment 5

The structure and principle of the embodiment are substantially identical with those of the embodiment 1, which will not be redundantly repeated herein, but the difference thereof is that: the outer diameter of the air checking ring 14 is equal to the outer diameter of the screw head 12.

Embodiment 6

The structure and principle of the embodiment are substantially identical with those of the embodiment 1, which will not be redundantly repeated herein, but the difference thereof is that: the outer diameter of the air checking ring 14 is larger than the outer diameter of the screw head 12.

Embodiment 7

The structure and principle of the embodiment are substantially identical with those of the embodiment 1, which will not be redundantly repeated herein, but the difference thereof is that: the end face of the screw head 12 provided with the concave-convex matching structure 13 is an arc convex and the arc convex is matched with the circumferential surface of the vehicle tire.

Embodiment 8

The structure and principle of the embodiment are substantially identical with those of the embodiment 1, which will not be redundantly repeated herein, but the difference thereof is that: the outer annular conical surface and/or the oriented angular surface is provided with a plurality of annular grooves with a gradually narrowing outer diameter and the two adjacent grooves form an annular protrusion.

The specific embodiments described herein are only for illustrating the spirit of the present invention. Those skilled in the art to which the present invention belongs may make various modifications or supplements or adopt similar alternatives without departing from the spirit of the present invention or beyond the scope defined by the appended claims.

Although terms of the tire repairing screw 1, the sharp portion 11, the screw head 12, the concave-convex matching structure 13, the air checking ring 14, the outer annular conical surface 15, the annular protrusion 15a, the position limiting notch 16, the sealing sleeve 2, the inner annular conical surface 21, the annular groove 21a, the annular conical surface 22, the spiral protrusion 23, the annular protrusion 24, the annular positioning slot 25 and the like are used pretty often herein, but the possibility of use of other terms are not excluded. These terms are used only for more conveniently describing and explaining the essence of the present invention and the interpretation of them as any additional limitation is against the spirit of the present invention.

What is claimed is:

1. A quick tire repairing nail, comprising a tire repairing screw made of a hard material, a front end of the tire repairing screw being provided with a sharp portion and a rear end of the tire repairing screw being provided with a screw head, and a surface of the screw head which is far away from the tire repairing screw being provided with a concave-convex matching structure,
    wherein, the tire repairing nail further comprises a sealing sleeve wrapping an outside of the screw head and/or the tire repairing screw, the sealing sleeve is made of a soft material and has a taper structure with a small front end and a bigger rear end, the tire repairing screw further comprises at least one air checking ring at the end approaching the screw head, the outer diameter of each air checking ring is less than or equal to or more than that of the screw head;
    the hard material is selected from the group consisting of carbon steel, stainless steel, copper, aluminum alloy, and plastic; and
    the soft material is selected from the group consisting of rubber and silica gel.

2. The quick tire repairing nail of claim 1, wherein the sealing sleeve sleeves the outside of the at least one air checking ring, and an oriented angular surface slanting towards the sharp portion is formed on the outer wall of each air checking ring.

3. The quick tire repairing nail of claim 2, wherein the outer wall of the screw head is provided with an outer annular conical surface slanting towards the tire repairing screw.

4. The quick tire repairing nail of claim 3, wherein the outer annular conical surface and/or the oriented angular surface is provided with a plurality of annular projections with a gradually narrowing outer diameter and each two adjacent annular projections are connected or spaced.

5. The quick tire repairing nail of claim 4, wherein the sealing sleeve firmly embeds the tire repairing screw, the screw head and each air checking ring; or the sealing sleeve is a band coiling around the tire repairing screw, the screw head and each air checking ring.

6. The quick tire repairing nail of claim 1, wherein a plurality of threads are exposed on the sharp portion, and a corresponding front end portion of the sealing sleeve is smoothly transited to the exposed threads; and the thread of the tire repairing screw is arranged with a position limiting structure for preventing the tire repairing screw from rotating in the direction opposite to the screwing-in direction of the tire repairing screw.

7. The quick tire repairing nail of claim 1, wherein an outer wall of the sealing sleeve is shaped as an annular conical surface.

8. The quick tire repairing nail of claim 1, wherein an outer wall of a front end of the sealing sleeve is provided with spiral projections corresponding to the threads on the tire repairing screw, and a rear end of the sealing sleeve is provided with at least one annular projection corresponding to at least one air checking ring.

9. A method for using the quick tire repairing nail of claim 1, comprising the following steps of:
(a) rotating a tire installed in an automobile that needs to be repaired to the repairing position where a puncture wound of the tire is visible, examining whether the puncture wound has foreign matter within it and pulling out the foreign matter if it exists; and
(b) aiming the sharp portion of the front end of the tire repairing screw at the puncture wound, using a tool and making the tool match with the concave-convex matching structure, rotating the tool by the action of an external force and thus driving and squeezing the tire repairing screw and the sealing sleeve continuously into the puncture wound wherein the rear end face of the screw head is flush with the outer surface of the tire or the rear end face of the screw head is caught in the outer surface of the tire.

* * * * *